United States Patent [19]

Spielau et al.

[11] 4,371,654

[45] Feb. 1, 1983

[54] MOLDING COMPOSITIONS BASED ON ESTER-COMPATIBLE THERMOPLASTIC AND/OR ELASTOMERIC SYNTHETIC RESINS

[75] Inventors: Paul Spielau, Troisdorf-Eschmar; Horst Vohwinkel, Troisdorf-Eschmar; Werner Kuhnel, Neunkirchen-Schoneshof, all of Fed. Rep. of Germany

[73] Assignee: Dynamit Nobel Aktiengesellschaft, Troisdorf, Fed. Rep. of Germany

[21] Appl. No.: 273,504

[22] Filed: Jun. 15, 1981

[30] Foreign Application Priority Data

Jun. 14, 1980 [DE] Fed. Rep. of Germany ....... 3022468

[51] Int. Cl.[3] .............................................. C08K 5/12

[52] U.S. Cl. ...................................... 524/296; 524/59

[58] Field of Search .................... 260/31.8 R; 524/296

[56] References Cited

U.S. PATENT DOCUMENTS 2,628,207 2/1953 Smith et al. .................... 260/31.8 R 3,892,796 7/1975 Leibfried ........................ 260/468 K

*Primary Examiner*—Joseph L. Schofer

*Assistant Examiner*—N. Sarofim

*Attorney, Agent, or Firm*—Antonelli, Terry & Wands

[57] ABSTRACT

A molding composition contains an ester-compatible, thermoplastic and/or elastomeric synthetic resin, optionally other additives including plasticizers, stabilizers, pigments, mold lubricants fillers, antioxidants, high-polymeric additives and bitumen and the DMT distillation residue formed during the manufacture of dimethyl terephthalate by the Witten process. Generally the composition contains at least 5 parts by weight of the residue per 100 parts by weight of the synthetic resin.

17 Claims, No Drawings

MOLDING COMPOSITIONS BASED ON ESTER-COMPATIBLE THERMOPLASTIC AND/OR ELASTOMERIC SYNTHETIC RESINS

The invention relates to molding compositions based on ester-compatible, thermoplastic and/or elastomeric synthetic resins optionally containing further additives, such as plasticizers, stabilizers, pigments, Lubricant fillers, antioxidants, high-polymeric additives, bitumen, and others.

An object of the present invention is to render such molding compositions less expensive by adding less expensive materials, while yet retaining essentially the properties of the molding compositions demanded by the particular field of usage.

It has been found that this object can be attained in a surprising and advantageous way by the use of a distillation residue, obtained in the production of dimethyl terephthalate, as an additive to the molding compositions mentioned hereinabove.

In the manufacture of dimethyl terephthalate (DMT) on a large technical scale by the Witten process, p-xylene and p-toluic acid ester are subjected to combined oxidation and subsequently esterified. The products formed during esterification are then separated. During this separating step, appreciable amounts of by-products remain as the distillation residue, see German Pat. No. 1,041,945, which is called DMT distillation residue and is obtained from the Witten process for the production of DMT. The manufacture of DMT is f.i. described in U.S. Pat. Nos. 2,894,978 and 3,253,017.

This DMT distillation residue consists of a mixture of high-boiling products which cannot be separated any further by distillation according to conventional methods on a large technical scale. From a qualitative viewpoint, it has thus far been determined that this mixture contains approximately 40 compounds from the group of high-boiling acids, esters, alcohols, and aldehydes. Among these compounds are, for example, monomethyl terephthalate, terephthalic acid, methyl esters of diphenyl carboxylic acids, and binuclear esters of the type of toluyl toluate. However, this residue contains furthermore also condensation products and tarry products which cannot be distilled and cannot be identified in any detail. The proportion of these products in this DMT distillation residue is subject to strong fluctuations, depending on the mode of operating the process.** For this reason, the DMT distillation residue also lacks any uniform, physical data. The spectrum of properties can be described as follows:

Deep-brown to almost black masses are involved here, which are flowable only at temperatures of above 100° C. to a certain extent, though still being extremely viscous, and which become pourable at temperatures of above 150° C.; these masses solidify into a paste at lower temperatures and, at room temperature, the masses exist in a polyphase form with nonuniform characteristic, in a doughy to solid or glassy consistency. The acid number of these residues is generally between 10 and 30, but can also amount to 50 and thereabove. The saponification numbers are mostly between the values of 400 and 450. The DMT distillation residue swells in the presence of water, but is insoluble therein. The residue exhibits a certain affinity to bitumen and thus can be utilized in applications requiring bitumen compatibility.

**A list of products to be found in the residue is added after Table 2.

Due to the large-scale technical significance of dimethyl terephthalate for the production of polyesters, the DMT distillation residue is accumulated in correspondingly large quantities. Heretofore, much thought has been given to the way in which this residue could be sensibly exploited; see, for example, DOS (German Unexamined Laid-Open Application) No. 2,429,352, according to which the DMT distillation residue is hydrogenated up to substantially complete ring saturation and is then reacted, for example, with alcohols into products having plasticizer properties.

Numerous attempts have likewise become known to utilize the DMT distillation residue directly, for example as a modifier for phenolic resins, see DOS No. 2,415,846, or as an additive for road marker agents, see Russian Patent No. 572,478, and others.

However, the fact that these suggestions can only be realized technically with difficulty, and the expenditure in process technology connected therewith, has had the result that even today the predominantly major portion of the DMT distillation residues is combusted to at least utilize the combustion energy and to relieve the need to dispose of the residue in trash dumps.

The present invention, now, solves two problems at a time, namely, on the one hand, the exploitation of the DMT distillation residue and, on the other hand, the question of making molding compositions on the basis of ester-compatible thermoplastic and/or elastomeric synthetic resins more economical by adding DMT distillation residue. The DMT distillation residue exhibits plasticizer-like properties and thus acts as a plasticizer as well as a filler for the molding composition. For example, a portion of plasticizer in plasticizer-containing molding compositions can be replaced by a suitable proportion of DMT distillation residue.

All those thermoplastic and elastomeric synthetic resins which are compatible with esters also show a surprisingly high compatibility with DMT distillation residues. The high compatibility of the DMT distillation residues with the aforementioned synthetic resins does not only manifest itself in that many physical properties of such modified synthetic resin molding compositions and the processing products made therefrom remain preserved, or are approximately retained, but also in that additionally several properties appear improved. In this connection, emphasis is placed on the high resistance against water, a water-repellant effect, the low volatility as compared with many plasticizers, a high biostability, i.e. resistance against the attack of bacteria, fungi, and microorganisms, occurring, for example, during usage in building and underground construction, as well as the plasticizer effect. The behavior displayed by DMT residue under low temperatures, which is actually less advantageous as compared with conventional plasticizers, can be compensated for by adding larger quantities of DMT residue as compared with customery plasticizer amounts. In total, it is possible by adding suitable quantities of DMT distillation residue to satisfy the requirements regarding the property spectrum expected of the respectively obtained molding compositions and simultaneously to meet the demands regarding economy.

A preferred group of thermoplastic synthetic resins for applying the invention is constituted by the vinyl resins, which are understood to include, in a broader sense, vinyl chlorides, vinyl acetates, vinyl ethers, vinyl fluoride, the polymerization products thereof, and the polymers of methacrylic acid and the derivatives thereof. A preferred group, used according to this invention, comprises polyvinyl chloride and/or the copolymers of vinyl chloride. They can be advantageously extended by additions of DMT distillation residues, and an especially advantageous usage is in connection with conventional plasticizer-containing polyvinyl chlorides. Soft PVC molding compositions for the manufacture of films, sealing sheets, panels, floor coverings, etc., preferably have a ratio of PVC to plasticizer of 85:15 to 50:50, preferably 70:30 to 60:40. It is possible according to the invention to substitute a partial amount of the plasticizer by DMT distillation residue without substantially altering the property spectrum of the molding composition and the products made therefrom, i.e. the required usage properties are still preserved. In this connection, larger amounts of DMT distillation residue can be provided for smaller amounts of plasticizers.

In the processing of molding compositions based on PVC basis, preferred plasticizers are esters of polybasic acids with monohydric alcohols, especially phthalates, esters of adipic acid and sebacic acid, trimellitic acid esters, paraffin-sulfonic acid phenyl/cresyl esters. It has been found, for example, surprizingly that with the combined use of dioctyl phthalate as the plasticizer and DMT distillation residues, the plasticizer properties of dioctyl phthalate remain preserved.

Even small amounts of DMT distillation residue can be added to molding compositions in accordance with this invention, but it is advantageous to add the DMT distillation residue in an amount of at least 5 parts by weight per 100 parts by weight of synthetic resin. In case of molding compositions on the basis of vinyl resins, especially PVC and soft PVC compositions, it is preferred to use 20–100 parts by weight of DMT distillation residue per 100 parts by weight of synthetic resin in the molding composition. In this connection, the molding composition can additionally contain fillers, such as calcium carbonates, kaolin, asbestos, carbon black, flue dust, alumina trihydrate, silicates, dolomite, talc, glass fibers, individually or in combination, depending on the usage and processing of the product made from the molding composition. The quantities can vary greatly depending on the required usage profile and are preferably assumed to be in the range from 10 to 100 parts by weight of fillers per 100 parts by weight of synthetic resins. The molding compositions can moreover contain, in addition to a basic synthesis resin, also additional high polymers with specific properties, such as impact strength modifiers or proportions of other synthetic resins compatible therewith, in the form of a mixture.

Another group of thermoplastic synthetic resins usable according to this invention are ethylene-acrylate copolymer/bitumen mixtures, ethylene/vinyl acetate copolymer, chlorinated polyethylene, chlorosulfonated polyethylene, or polyisobutene, individually or also in mixtures with each other.

This group of thermoplastic synthetic resins, just as the soft PVC and the copolymers of polyvinyl chloride, have found a special field of application in the manufacture of sealing sheets and panels for building construction and for floor coverings. Especially for these usages, the molding composition of this invention can be employed with particular advantage. In this connection, the molding composition can be utilized for producing films, sheets, or panels, for example by extrusion, rolling, calendering, or spread-coating. The advantageous properties of the DMT distillation residue, such as water repellency, biostability, and low volatility, find an especially advantageous application in these usages. Preferably, here again at least 10 parts by weight of DMT distillation residue is employed per 100 parts by weight of synthetic resin, but parts by weight amounting to 15–40 are possible and advantageously used depending on the field of application.

Another group of thermoplastic synthetic resins, compatible with DMT distillation residue and being processable therewith, are thermoplastic compositions on the basis of cellulose esters, such as a resin of cellulose acetate, cellulose acetobutyrate, cellulose acetopropionate, cellulose nitrate or cellulose propionate.

The present invention likewise is directed to the use of the distillation residue obtained in the manufacture of dimethyl terephthalate as an additive to ester-compatible, thermoplastic and/or elastomeric synthetic resins, optionally containing further additives, such as plasticizers, Lubricant, stabilizers, pigments, fillers, high-polymeric additives, antioxidants, bitumen, and others, especially for producing sealing sheets and panels in building and underground construction.

High polymer sheets on the basis of thermoplastic or elastomeric synthetic resins have been disclosed, for example, in the periodical "Kunststoffe im Bau" (Synthetic Resins in Construction) 14th year, 1979, issue 4, pp. 195–201. All those synthetic resin or elastomer sheets built up on the basis of ester-compatible synthetic resins are modifiable with DMT distillation residue according to the invention, i.e., for example, ethylene copolymer-bitumen sheets, ethylene-vinyl acetate copolymer sheets, sheets of chlorinated polyethylene, polyisobutene sheets, polyvinyl chloride soft sheets, chlorosulfonated polyethylene sheets. In this context, preserved are the bitumen compatibility of the sheets, their weldability or ability to be cemented together; the tensile strength values are likewise essentially retained.

The invention will be further explained with reference to the following examples.

Examples 1 through 10 comprise molding compositions on the basis of PVC as the thermoplastic synthetic resin, with and without a conventional plasticizer. The effects of additions of DMT distillation residue are examined on the behavior of panels made from the molding compositions by rolling and having a thickness of 1 mm, with varying molding composition ingredients, and are compiled in Table 1.

The recipes of Examples 1–10 contain a PVC having a K-value of 70, dioctyl phthalate as the plasticizer, DMT distillation residue, customary mold release agents, as the fillers either natural calcium carbonates or flue dust from an electrostatic filtering plant; the rolling characteristic is evaluated according to customary criteria to be either tackily adhesive or not adhesive or readily processable; furthermore the Shore hardness A is indicated, along with the tensile strength in $N/mm^2$ according to DIN (German Industrial Standard) No. 53 455; the elongation in % according to DIN No. 53 455; and the resistant to low-temperature impact rupture measured according to DIN No. 53 372.

The recipe components of Examples 1–10 were individually premixed in a mixer, plasticized at temperatures of between 140° and 160° C., and rolled on rolling mills at rolling temperatures of between about 140° and 150° C. into panels having a thickness of 1 mm. Example 1 represents a normal soft PVC sheet, wherein PVC and plasticizer together amount to 100 parts by weight. Additionally, 10 parts by weight of filler is added. Such a sheet is customarily used in the construction field as a sealing sheet for many applications.

In Examples 2 and 3, the basic batch according to Example 1 of 100 parts by weight of PVC and plasticizer is altered by substituting 30 parts by weight of DMT distillation residue in proportions for plasticizer and PVC. The proportions of mold lubricant are slightly raised to improve processability. With additions of varying amounts of fillers, in this case calcium carbonate, sheets are produced, the properties of which can be designated as very useful, after all, in spite of the high proportion of DMT distillation residue with reduced proportions of PVC, and which are likewise still usable as sealing sheets in the construction field. For example, for such sheets, with a slightly reduced low-temperature resistance, uses are contemplated such as floor sheeting, protective layers which are loosely laid, optionally in the form of panels, or as agricultural sheet material, etc.

In Example 4, the formulation according to Example 2 has been altered only with respect to the filler by using, instead of calcium carbonate, very inexpensive flue dust. It is found here that the values for tensile strength, elongation, and low-temperature behavior have a slightly lower tendency than with the use of calcium carbonate as the filler.

Example 5 shows a composition of PVC, plasticizer, and DMT residue varied with respect to Example 2 and also showing a slightly altered property spectrum. At the same time, a comparison of Examples 2 and 5 shows that even a high addition of DMT distillation residue in plasticized PVC molding compositions changes the properties only to a minor extent.

Example 7 shows a comparison recipe, 65 parts by weight of PVC and 35 parts by weight of plasticizer, together 100 parts by weight, processed into a soft PVC sheet without fillers. Example 8 demonstrates an embodiment according to this invention wherein part of the plasticizer of Example 7 has been replaced by DMT distillation residue. The thus-produced sheet shows, as compared with Example 7, an increased Shore hardness and tensile strength, but reduced elongation and lowered cold resistance. Yet, this sheet fulfills the requirements regarding the usage profile for many purposes in construction, for example use as a sealing sheet, a protective layer, a floor covering substrate, etc.

Example 9 shows an embodiment according to this invention for a hard PVC film modified with respect to impact strength by adding DMT distillation residue. Example 10 is a comparative example with 100 parts by weight of PVC without DMT distillation residue, to be able to compare the properties of the resulting molding composition.

Examples 11 and 12 illustrate the use of DMT residue with ethylene/vinyl acetate (EVA) having a 14% vinyl acetate proportion. The resultant sheets according to Example 12 show, with the use of DMT residue as an extender, also a property spectrum which still bears up to comparison with the sheets of pure EVA according to Example 11.

TABLE 1

| Examples | 1 | 2 | 3 | 4 | 5 | 6 | 7 | 8 | 9 | 10 | 11 | 12 |
|---|---|---|---|---|---|---|---|---|---|---|---|---|
| EVA Parts by weight | — | — | — | — | — | — | — | — | — | — | 100 | 85 |
| PVC K-Value 70 (Parts by Weight) | 64 | 50 | 50 | 50 | 52 | 52 | 65 | 65 | 85 | 100 | — | — |
| DOP (Parts by Weight) | 36 | 20 | 20 | 20 | 24 | 24 | 35 | 24 | — | — | — | — |
| DMT-Residue (Parts by Weight) | — | 30 | 30 | 30 | 24 | 24 | — | 11 | 15 | — | — | 15 |
| Stabilizers + Lubricants | 7 | 2 | 2 | 2 | 2 | 3 | 3 | 3 | 3 | 3 | 4 | 4 |
| Agents (Parts by Weight) | 1.7 | 3.3 | 3.3 | 3.3 | 3.3 | 2.7 | 2.7 | 2.7 | 2.7 | 2.7 | 3 | 3 |
| Calcium Carbonate (Parts by Weight) | 10 | 18 | 50 | — | 18 | — | — | — | — | — | — | 18 |
| Flue Dust (Parts by Weight) | — | — | — | 18 | — | — | — | — | — | — | — | — |
| Rolling Behavior | good | good | good | good | good | good | good | good | good | good | good | good |
| Shore Hardness A | 81 | 83 | 87 | 82 | 77 | 73 | 80 | 83 | 98 | 99 | 94 | 90 |
| Tensile Strength (N/mm$^2$) | 17.7 | 15.3 | 11.5 | 12.8 | 15.3 | 16.5 | 20.3 | 25.3 | brittle | 50 | 19.0 | 10.8 |
| Elongation (%) | 260 | 234 | 176 | 186 | 312 | 238 | 328 | 256 | brittle | 30 | 600 | 640 |
| Low-Temperature Brittleness °C. | −35 | −17 | +9 | −15 | −7 | −14 | −39 | −19 | brittle | — | — | — |

1 1,5 BaCd and 0,2 stearin acid
2 2,0 lead sulfate and 0,7 lecid stearate and 0,6 polyethylene wax
3 2 lead sulfate and 0,7 lead stearate
4 2 dibuthyltinmercaptide and 1 Montanacidester Examples 13 to 16 comprise molding compositions with other thermoplastic synthetic resins with and without DMT-residue, the effects and ingredients are compiled in Table 2. The examples have been prepared the same way as examples 1 to 12.

The examples show clearly, that the addition of DMT residue to chlorinated Polyethylene see example 14, respectively Polyisobutylene, see example 16 does change the Shore hardness, tensile strength elongation and low temperature brittleness a little bit, but results in a suitable product.

TABLE 2

| Examples | 13 | 14 | 15 | 16 |
|---|---|---|---|---|
| PEC 42% chlor | 100 | 70 | — | — |
| PIB (parts by weight) | — | — | 100 | 85 |
| DMT-residue (parts by weight) | — | 30 | — | 15 |
| lead sulfate | 2,0 | 2,0 | — | — |
| lead stearate | 0,7 | 0,7 | — | — |
| Polyethylene wax | 0,6 | 0,6 | — | — |
| calcium carbonate | 18 | 18 | — | — |
| talcum (parts by weight) | — | — | 18 | 18 |
| Rolling behaviour | good | good | good | good |
| shore Hardness A | 57 | 61 | 27 | 27 |
| Tensile strength N/mm$^2$ | 10,8 | 8,8 | 2,0 | 3,1 |
| Elongation % | 550 | 580 | 600 | 660 |
| Low Temp. Brittleness °C. | −50 | −20 | −52 | −47 |

List of some products contained in DMT-residue:
Benzoic acid, methyl ester orthophthalic acid, dimethyl ester
isophthalaic acid, dimethyl ester
terephthalic acid, dimethyl ester
4-methylorthophthalic acid, dimethyl ester
4-methlisophthalic acid, dimethyl ester
methylterephthalic acid, dimethyl ester
trimellitic acid, trimethyl ester
trimellitic acid, monomethyl ester
anhydrotrimellitic acid, methyl ester
phthalidcarboxylic acid, 4-methyl ester
terephthalaldehydic acid, methyl ester
terephthalaldehydic acid, methyl ester, dimethyl acetal
hydroxyterephthalic acid, dimethyl ester
hydroxymethyl benzoic acid
4-methylbenzyl-p-toluate
4-carbomethoxybenzyl-p-toluate
terephthalic acid, methyl-p-methylbenzyl ester
terephthalic acid, methyl-p-carbomethoxybenzyl ester
di(p-carbomethoxybenzyl) ether
4-diphenylcarboxylic acid, methyl ester
4'-methyldiphenylcarboxylic acid, 4-methyl ester
2,4'-diphenyldicarboxylic acid, dimethyl ester
3,4'-diphenyldicarboxylic acid, dimethyl ester
4,4'-diphenyldicarboxylic acid, dimethyl ester
3,3'-diphenyldicarboxylic acid, dimethyl ester
4-methyl-2,5'-diphenyldicarboxylic acid, dimethyl ester
5-methyl-2,4'-diphenyldicarboxylic acid, dimethyl ester
2,4',5-diphenyldicarboxylic acid, dimethyl ester
4,4'-benzophenonedicarboxylic acid, dimethyl ester
5-methyl-8-carbomethoxy-3,4-benzocumarin
7,8'-dicarbomethoxy-3,4-benzocumarin
2,4'-fluorenonedicarboxylic acid, dimethyl ester

What is claimed is:

1. A molding composition containing an ester-compatible, vinyl resin and/or elastomeric synthetic resin and characterized in that the molding composition further contains DMT distillation residue formed during the manufacture of dimethyl terephthalate by the Witten process.

2. A molding composition according to claim 1, characterized in that the composition contains additives including plasticizers, stabilizers, pigments, lubricants, fillers, antioxidants, high-polymeric additives and bitumen.

3. A molding composition according to claim 2, characterized in that the vinyl resin is polyvinyl chloride and/or copolymers of vinyl chloride.

4. A molding composition according to claim 3, characterized in that the composition additionally contains at least one plasticizer in a weight ratio of PVC to plasticizer of 85:15 to 50:50.

5. A molding composition according to claim 3, characterized in that the composition contains at least one plasticizer in a weight ratio of PVC to plasticizer of 70:30 to 60:40.

6. A molding composition according to claim 4, characterized in that a partial quantity of the plasticizer is replaced by the DMT distillation residue.

7. A molding composition according to claim 4 or 6, characterized in that the plasticizer for PVC is an ester of a polybasic acid with a monohydric alcohol.

8. A molding composition according to claim 1, characterized in that the composition contains the DMT distillation residue in an amount of at least 5 parts by weight per 100 parts by weight of the resin.

9. A molding composition according to claim 2, characterized in that the composition contains 20–100 parts by weight of the DMT distillation residue per 100 parts by weight of the resin.

10. A molding composition according to claim 2, characterized in that the composition additionally contains at least one filler selected from the group consisting of calcium carbonate, kaolin, asbestos, carbon black, flue dust, alumina trihydrate, metal silicates, dolomite, talc and glass fibers, in amounts of 10–100 parts by weight per 100 parts by weight of the resin.

11. A molding composition containing DMT distillation residue formed during the manufacture of dimethyl terephthlate by the Witten process and an ester-compatible synthetic resin that is an ethylene-acrylate copolymer/bitumen mixture, ethylene-vinyl acetate copolymer, chlorinated polyethylene, chlorosulfonated polyethylene, or polyisobutene.

12. A molding composition according to claim 10, characterized in that the composition contains the DMT distillation residue in an amount of at least 10 parts by weight per 100 parts by weight of the resin.

13. A molding composition according to claim 10 or 11, characterized in that the composition contains 15–40 parts by weight of the DMT distillation residue per 100 parts by weight of the resin.

14. A process for the production of films, sheets, or panels from the molding composition of claim 1, wherein the composition is shaped by extrusion, rolling, calendering, or spread-coating, to provide multiple-layer composite covers, as sealing means and protective covers in building and underground construction.

15. A process for compounding a molding composition for the manufacture of a sheet and/or panel for sealing purposes in building and underground construction which comprises admixing the DMT distillation residue obtained in the manufacture of dimethyl terephthalate as an additive with ester-compatible, therom-plastic and/or elastomeric synthetic resins optionally containing additional auxiliary agents including as plasticizers, stabilizers, pigments, fillers, high-polymeric additives, antioxidants, and bitumen, and thereafter shaping the composition into the sheet and/or panel.

16. A molding composition according to claim 1, wherein said DMT distillation residue consists essentially of a mixture of high boiling products, condensation products and tarry products which are formed directly during the manufacture of the dimethyl terephthalate (DMT) by the Witten process.

17. A process according to claim 15, wherein said DMT distillation residue consists essentially of a mixture of high boiling products, condensation products and tarry products formed directly during the manufacture of dimethyl terephthalate (DMT) by the Witten process.

* * * * *